(12) United States Patent
Minemura et al.

(10) Patent No.: US 7,106,538 B2
(45) Date of Patent: Sep. 12, 2006

(54) LIBRARY APPARATUS

(75) Inventors: Tsukasa Minemura, Kawasaki (JP);
Kohjiroh Hashimoto, Kawasaki (JP);
Hidetaka Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/991,850

(22) Filed: Nov. 19, 2004

(65) Prior Publication Data

US 2006/0023335 A1 Feb. 2, 2006

(30) Foreign Application Priority Data

Jul. 28, 2004 (JP) ............................. 2004-220813

(51) Int. Cl.
*G11B 15/68* (2006.01)
(52) U.S. Cl. ..................... 360/71; 360/92; 700/218; 700/248; 700/255
(58) Field of Classification Search ............... None
See application file for complete search history.

(56) References Cited

U.S. PATENT DOCUMENTS

| | | | |
|---|---|---|---|
| 4,504,936 A * | 3/1985 | Faber et al. ............. 369/34.01 |
| 5,640,510 A * | 6/1997 | Hanaoka et al. ............. 714/42 |
| 6,161,058 A * | 12/2000 | Nishijo et al. ............. 700/218 |
| 6,215,315 B1 * | 4/2001 | Maejima ..................... 324/539 |
| 6,493,604 B1 * | 12/2002 | Kappel et al. ............. 700/213 |
| 6,591,164 B1 * | 7/2003 | Plutt et al. .................. 700/245 |
| 6,778,351 B1 * | 8/2004 | Coffin et al. .................. 360/92 |
| 6,785,588 B1 * | 8/2004 | Dimitri et al. ............. 700/214 |
| 6,968,257 B1 * | 11/2005 | Ngo .......................... 700/214 |
| 2002/0071352 A1 * | 6/2002 | Ostwald .................. 369/30.48 |
| 2002/0114103 A1 * | 8/2002 | Coffin et al. .................. 360/92 |
| 2005/0246058 A1 * | 11/2005 | Ngo .......................... 700/214 |

FOREIGN PATENT DOCUMENTS

| JP | 7-44335 A | 2/1995 |
|---|---|---|
| JP | 2003-515687 A | 5/2003 |

OTHER PUBLICATIONS

"Error Recovery Scenarios for Dual-Gripper Pickers in Libraries," Jul. 1, 1996, IBM TDB vol. 39, No. 7, pp. 79-86.*

* cited by examiner

*Primary Examiner*—Hoa T. Nguyen
*Assistant Examiner*—James L Habermehl
(74) *Attorney, Agent, or Firm*—Staas & Halsey LLP

(57) ABSTRACT

A library apparatus includes a storage shelf that has a plurality of cells for housing a cartridge that stores a plurality of recording media; a recording and reproducing unit that performs recording/reproducing of information to/from the recording media; and a conveying mechanism that conveys the cartridge to a predetermined position in the storage shelf, between the storage shelf and the recording and reproducing unit. The conveying mechanism includes a first conveying mechanism that conveys the cartridge during a normal operation of the library apparatus; and a second conveying mechanism that conveys the cartridge during an abnormal-operation of the first conveying mechanism.

12 Claims, 12 Drawing Sheets

LIBRARY APPARATUS

BACKGROUND OF THE INVENTION

1) Field of the Invention

The present invention relates to a library apparatus that automatically conveys a storage medium, such as a magnetic tape, to a recording and reproducing unit (a drive) to perform reading and writing of information or data from/in the storage medium, and more particularly, to a library apparatus that allows an operation to be performed without stopping the library apparatus, even in a state that a conveying mechanism is malfunctioning.

2) Description of the Related Art

In recent years, there has been an increasing demand for a library apparatus provided with magnetic tape cartridges for increase in data or information amount in a computer system or for retrieval of data requiring a mass storage, such as multi-media data or graphics data. The library apparatus has a function that automatically performs loading of each magnetic tape cartridge to a cell, unloading the same, storing the same, recording/reproducing data or the like.

Specifically, a magnetic tape library apparatus includes a medium handling robot (a conveying mechanism) called as "an accessor" for automating conveyance of each recording medium (each magnetic tape cartridge), with which insertion/ejection of the recording medium to/from a medium storage unit (a cell) or mounting and demounting to the cell and a recording and reproducing unit (MTU/drive) are automatically performed. The magnetic tape library apparatus is connected to a host computer for communication to automatically perform saving of a magnetic tape cartridge, recording/reproducing of data or the like according to an instruction from the host computer.

As explained above, a magnetic tape library apparatus of this type establishes a library system that conveys a magnetic tape cartridge to a predetermined position in a storage shelf and performs recording/reproducing in the recording/reproducing apparatus (see, for example, Japanese Patent Application Laid-open No. H7-174475, Japanese Patent Application Laid-open No. H7-44335, and Japanese Utility Model Application Laid-open No. 2003-515867).

In the conventional magnetic tape library apparatus, however, there is a problem described below. In the conventional magnetic tape library apparatus, since it is necessary to stop the magnetic tape library apparatus (shut off the power) to work during a maintenance thereof, or when a trouble occurs in a mechanical unit in the conveying mechanism provided in the magnetic tape library apparatus (at a time of failure), a system on the client side has to be down due to stopping of the library system itself.

Specifically, in a configuration where only one conveying mechanism is provided like the conventional magnetic tape library apparatus, when a trouble occurs in any of the mechanical units configuring the conveying mechanical apparatus, the magnetic tape library apparatus falls into malfunction as a whole. Consequently, there occurs a problem that the system on the client side is considerably affected by such a trouble.

SUMMARY OF THE INVENTION

It is an object of the present invention to solve at least the above problems in the conventional technology.

A library apparatus according to one aspect of the present invention includes a storage shelf that has a plurality of cells for housing a cartridge that stores a plurality of recording media; a recording and reproducing unit that performs recording/reproducing of information to/from the recording media; and a conveying mechanism that conveys the cartridge to a predetermined position in the storage shelf, between the storage shelf and the recording and reproducing unit. The conveying mechanism includes a first conveying mechanism that conveys the cartridge during a normal operation of the library apparatus; and a second conveying mechanism that conveys the cartridge during an abnormal-operation of the first conveying mechanism.

A library apparatus according to another aspect of the present invention includes a storage shelf that has a plurality of cells for housing a cartridge that stores a plurality of recording media; a recording and reproducing unit that performs recording/reproducing of information to/from the recording media; and a conveying mechanism that conveys the cartridge to a predetermined position in the storage shelf, between the storage shelf and the recording and reproducing unit. The conveying mechanism includes a first conveying mechanism that conveys the cartridge during a normal operation of the library apparatus; a second conveying mechanism that conveys the cartridge during an abnormal-operation of the first conveying mechanism; and an abnormal-operation detecting unit that detects the abnormal-operation of the first conveying mechanism. The second conveying mechanism conveys the cartridge when the abnormal-operation of the first conveying mechanism is detected by the abnormal-operation detecting unit.

The other objects, features, and advantages of the present invention are specifically set forth in or will become apparent from the following detailed description of the invention when read in conjunction with the accompanying drawings.

DETAILED DESCRIPTION

Exemplary embodiments of a library apparatus according to the present invention will be explained in detail with reference to the accompanying drawings. In an embodiment described below, after an outline and a feature of a magnetic tape library apparatus are explained, configurations and functions of respective mechanism configuring the magnetic tape library apparatus will be explained in detail and procedures for a conveyance control of a magnetic tape cartridge performed by the magnetic tape library apparatus during a normal operation and at a time of detecting an abnormality signal will be explained.

Figure 1:
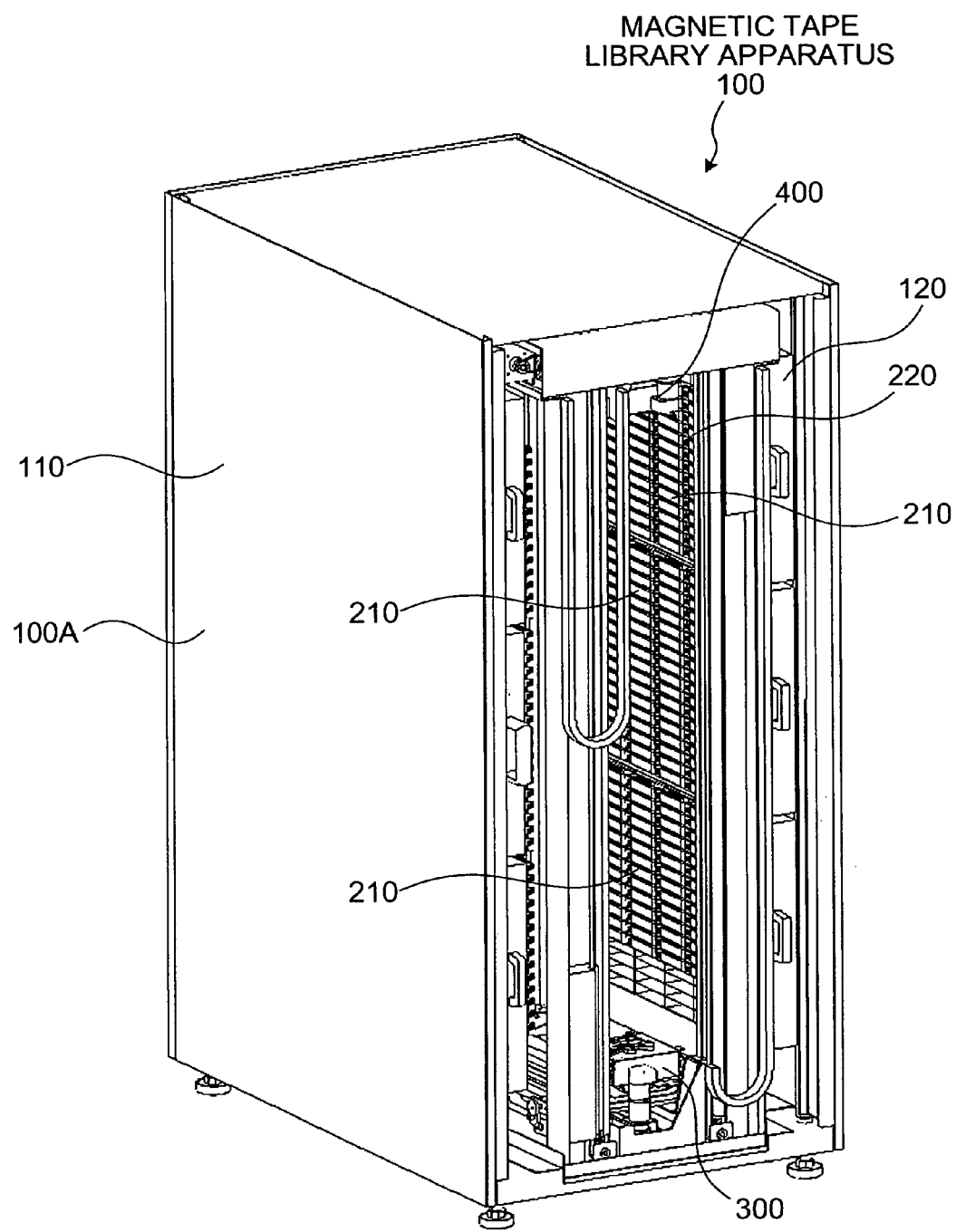
FIG. 1 is a perspective view of an entire configuration of a magnetic tape library apparatus.
Figure 2A:
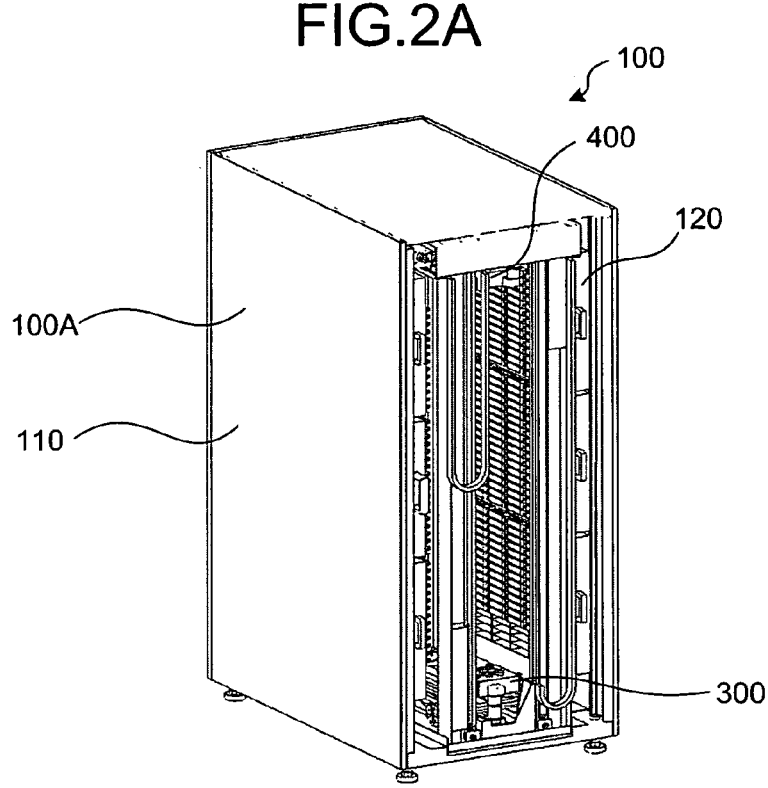
FIG. 2A is a perspective view of an accommodated state of an inner locker into an outer locker.
Figure 2B:
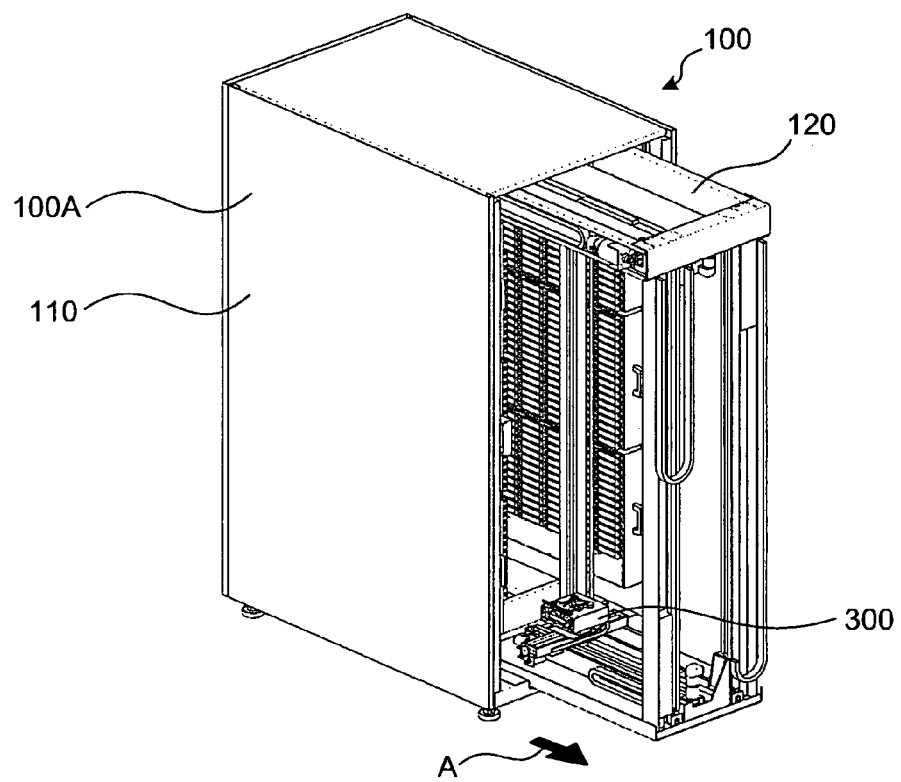
FIG. 2B is a perspective view of a taken-out state of the inner locker from the outer locker.
Figure 3:
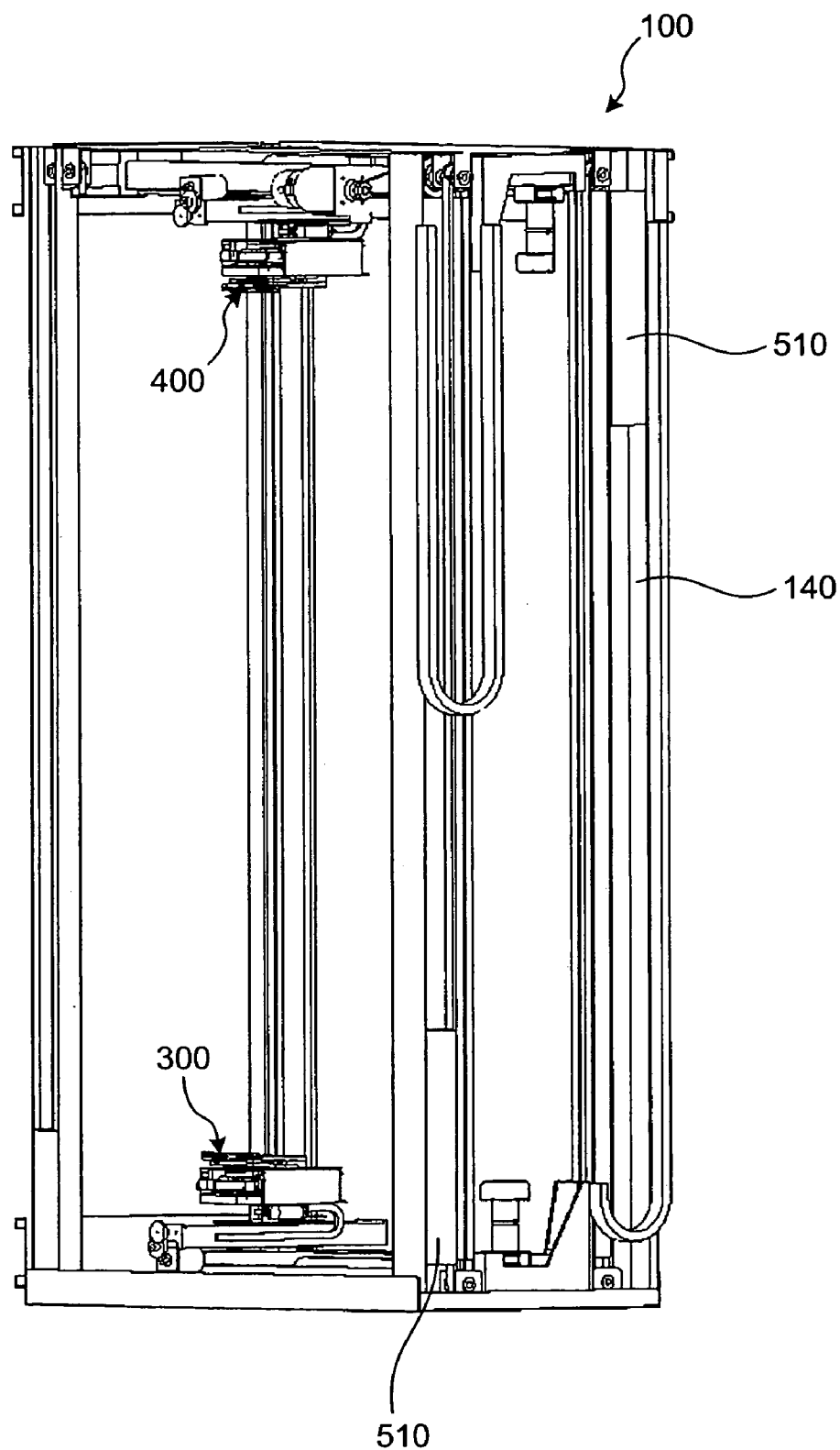
FIG. 3 is a configurational view of a main unit of the magnetic tape library apparatus.
Figure 4A:
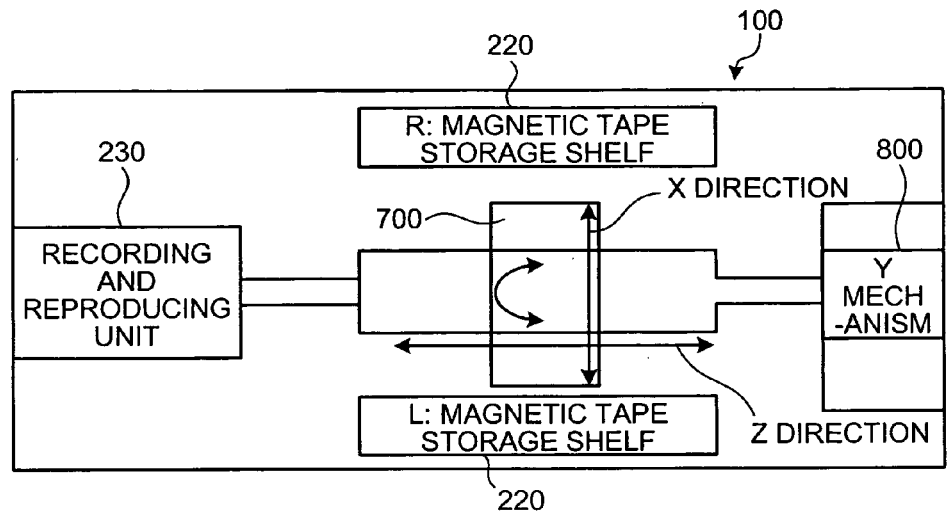
FIG. 4A is a plan view of the magnetic tape library apparatus.
Figure 4B:
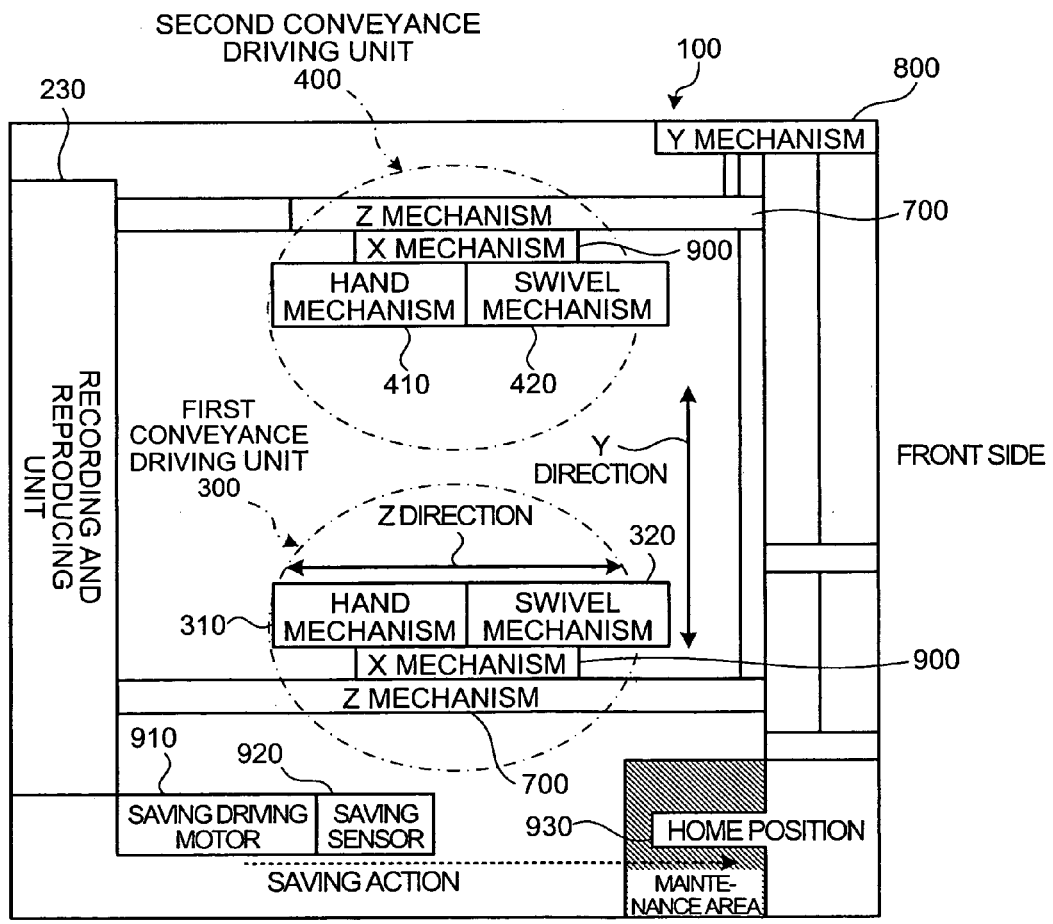
FIG. 4B is a schematic view of a configuration of the magnetic tape library apparatus.

FIG. 1 is a perspective view of an entire configuration of a magnetic tape library apparatus, FIG. 2A is a perspective view of an accommodated state of an inner locker provided therein with the magnetic tape library apparatus, FIG. 2B is a perspective view of a taken-out state of an inner locker, FIG. 3 is an entire configurational view of a main unit of the magnetic tape library apparatus, FIG. 4A is a configurational schematic plan view of the magnetic tape library apparatus, and FIG. 4B is a configurational schematic view of a side portion of the magnetic tape library apparatus.

A feature of a magnetic tape library apparatus 100 in the present invention lies in that a recovery maintenance can be realized by a conveying mechanism that allows such a redundancy that, in addition to a first conveying mechanism 300 that performs conveyance of each magnetic tape cartridge to a recording and reproducing unit 230 (a drive) during a normal operation, a second conveying mechanism 400 having a configuration and a function equivalent to those of the first conveying mechanism 300 is newly provided, whereby, when the first conveying mechanism 300 falls in an inoperable state (due to a maintenance/failure), the first conveying mechanism 300 is saved to a "maintenance area" where the first conveying mechanism 300 is subjected to maintenance/repair, and when the first conveying mechanism 300 reaches the "maintenance area", each magnetic tape cartridge is conveyed to the recording/reproducing apparatus 230 by activation of the second conveying mechanism 400.

Specifically, the magnetic tape library apparatus 100 in the present invention includes two conveying mechanisms (the first and the second conveying mechanisms 300, 400), where conveyance of each magnetic tape cartridge to the recording and reproducing unit 230 is performed by the first conveying mechanism 300 during a normal situation and the second conveying mechanism 400 separating from the first conveying mechanism 300 stands by in an upper portion in the magnetic tape library apparatus 100. However, when the first conveying mechanism 300 falls in an inoperable state (due to a maintenance/failure), the first conveying mechanism 300 is descended to a lowermost descended position of the apparatus 100 by an ascending and descending apparatus, and when the descending is detected by a saving sensor 920 (see FIG. 4B) that detects the lowermost descended position, the first conveying mechanism 300 is conveyed to the "maintenance area" where the first conveying mechanism 300 is subjected to maintenance/repair. Thereafter, conveyance of each magnetic tape cartridge is conducted by the second conveying mechanism 400 that stands by in the upper portion in the apparatus 100. That is, with such a configuration, even at a time of maintenance to the first conveying mechanism 300 or failure of any constituent part therein, operation of the system can be performed/secured without stopping the system so that a system down can be avoided.

As shown in FIG. 1, the magnetic tape library apparatus 100 is configured by a casing main unit 100a formed in a rectangular parallelopiped shape as a whole, that includes an outer locker 110 and an inner locker 120, and the apparatus 100 is provided with a pair of left and right magnetic tape storage shelves 220 having a plurality of cells 210 (six cells in this embodiment), each accommodating a plurality of magnetic tapes, a recording and reproducing unit (MTU) 230 (see FIG. 4A) that performs recording/reproducing of information or data to a magnetic tape cartridge, and first and second conveying mechanisms 300, 400 that automatically convey each magnetic cartridge between the magnetic tape storage shelves 220 and the recording and reproducing unit 230 to a predetermined position in the storage shelf 220 (a cell 221).

As shown in FIG. 2A and FIG. 2B, the casing main unit 100a configuring the magnetic tape library apparatus 100 is configured by the outer locker 110 and the inner locker 120 that is received inside the outer locker 110, and respective mechanism of the magnetic tape library apparatus 100 are actually accommodated inside the inner locker 120. Therefore, when a maintenance for the magnetic tape library apparatus 100 or the first or the second conveying mechanism 300, 400 or replacement of parts in a time of failure occurrence is performed, as shown in FIG. 2B, such a maintenance or replacement can be performed easily and efficiently by drawing the inner locker 120 from the outer locker 110 in a direction of arrow A (see FIG. 2B).

A configuration of the magnetic tape library apparatus 100 will be explained below in detail. That is, the magnetic tape library apparatus 100 is configured by the magnetic tape storage shelves 220 provided at RL (right and left) positions of the apparatus 100 (see FIG. 4A) and the recording and reproducing unit 230 (MTU/drive) provided at a rear portion of the apparatus 100. The recording and reproducing unit 230 (MTU) includes a function that performs writing of information or data in a magnetic tape cartridge and/or reading of information or data recorded on the magnetic tape cartridge.

Each magnetic tape storage shelf 220 receives a require number of magnetic tape cartridges. Further, such a configuration is employed that a magnetic tape cartridge is conveyed to the recording and reproducing unit 230 (MTU) according to conveyance performed by selected one of the first and the second conveying mechanisms 300, 400 and recording or reproducing of information or data is performed by the recording and reproducing unit 230 (MTU) based upon an instruction command from a host computer.

Each magnetic tape cartridge is attached with a predetermined bar-code label. Therefore, by reading the bar-code by a bar-code reader, a designated magnetic tape cartridge can be stored in a predetermined storage place (inside the cell 221) and recording in/reproducing from a designated magnetic tape cartridge can be made possible.

As shown in FIGS. 1 and 3, the magnetic tape library apparatus 100 equipped in the inner locker 120 are provided with the first and the second conveying mechanisms 300, 400 that are configured to be capable of ascending and descending along a vertical column 140 provided erectly in a vertical direction (a Y-axis direction) in upward and downward directions thereof. As shown in FIGS. 4A and 4B, the first and the second conveying mechanisms 300, 400 are each provided with an X-mechanism 700 that moves each of the first and the second conveying mechanism 300, 400 in an X-axis direction (in directions of moving the apparatus 300, 400 to the left and right magnetic tape storage shelves 220), an Y mechanism 800 that moves the apparatus 300, 400 in an X-axis direction (in upward and downward directions), and a Z mechanism 900 that moves the apparatus 300, 400 in a Z-axis direction (in front and rear directions of the apparatus 100).

Figure 5:
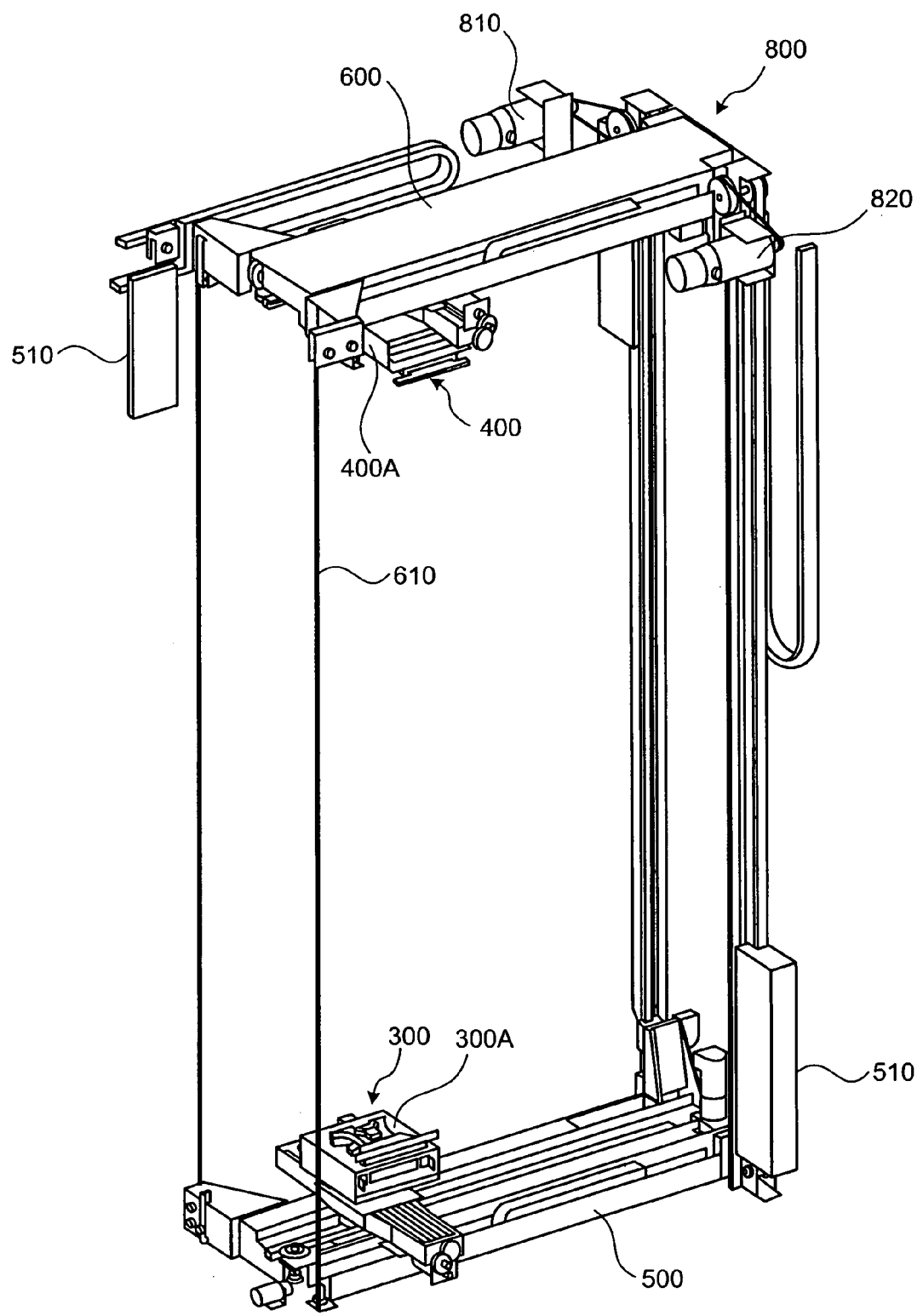
FIG. 5 is a perspective view of an entire configuration of the magnetic tape library apparatus.
Figure 6:
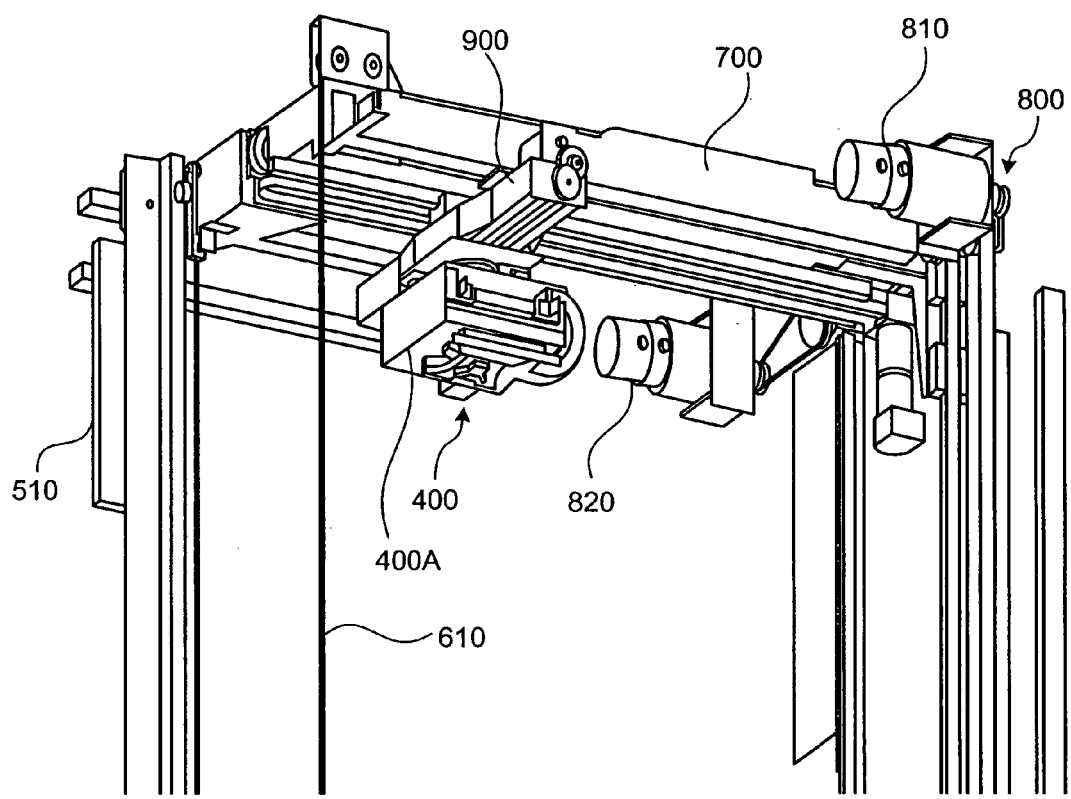
FIG. 6 is an enlarged perspective view of a main unit of a second conveying mechanism.

As shown in FIGS. 5 and 6, the Y mechanism 800 that performs ascending and descending of the first and the second conveying mechanisms 300, 400 is configured by a first conveyance driving motor 810 that ascends and descends the first conveying mechanism 300 in a vertical direction and a second conveyance driving motor 820 that ascends and descends the second conveying mechanism 400 in a vertical direction. Driving rotational shafts of the conveyance driving motors 810 and 820 are attached with ascending and descending wires 610, so that ascending and descending of the first and the second conveying mechanisms 300, 400 can be made possible by the ascending and descending wires 610.

That is, the first conveyance driving motor 810 that ascends and descends the first conveying mechanism 300 and the second conveyance driving motor 820 that ascends and descends the second conveying mechanism 400 are provided at an upper portion (see FIG. 6) of a main unit of the magnetic tape library apparatus 100. That is, the first conveying mechanism 300 can be moved in an ascending and descending manner in upward and downward directions by the ascending and descending wire 610 driven by the first conveyance driving motor 810, and the second conveying mechanism 400 can be moved in an ascending and descending manner in upward and downward directions by the ascending and descending wire 610 driven by the second conveyance driving motor 820.

Balancers 510, 510 are attached to ends of the respective ascending and descending wires 610, and the balancers 510, 510 have basically functions for maintaining balances of the first and the second conveying mechanisms 300, 400. In this embodiment, when power to the first and the second conveying mechanisms 300, 400 is turned off, the balancers 510, 510 have functions for allowing smooth lowering of the first and the second conveying mechanisms 300, 400 (either one of the balancers 510, 510 is set to be heavier that the other).

Figure 7:
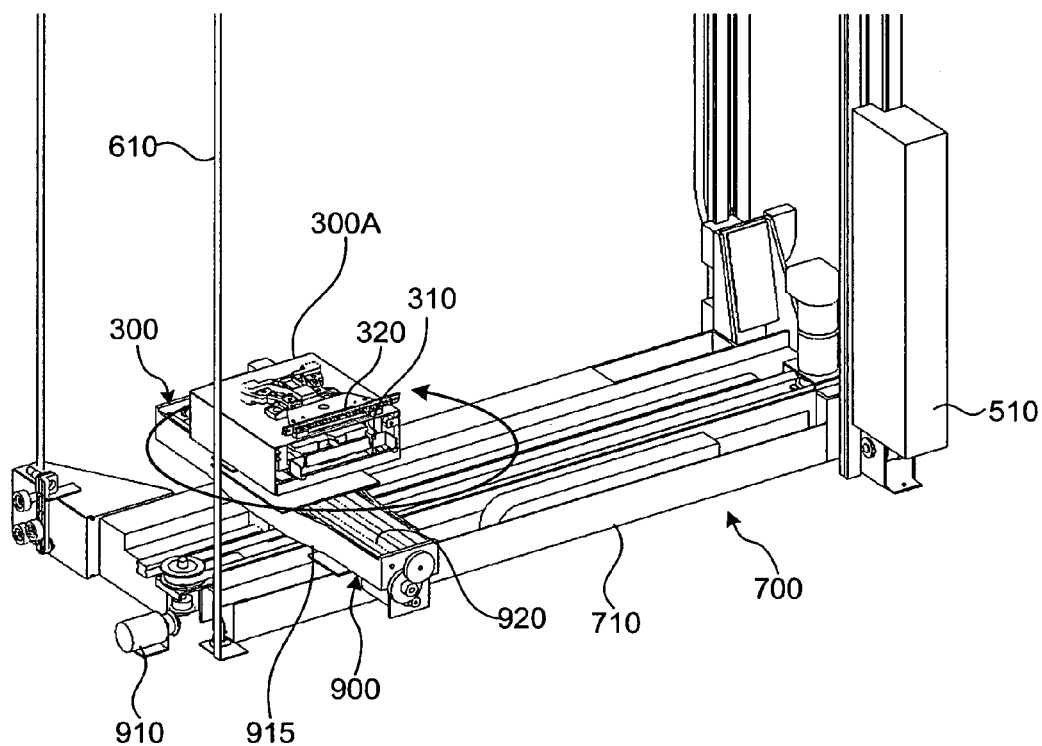
FIG. 7 is an enlarged perspective view of a main unit of a first conveying mechanism.
Figure 8:
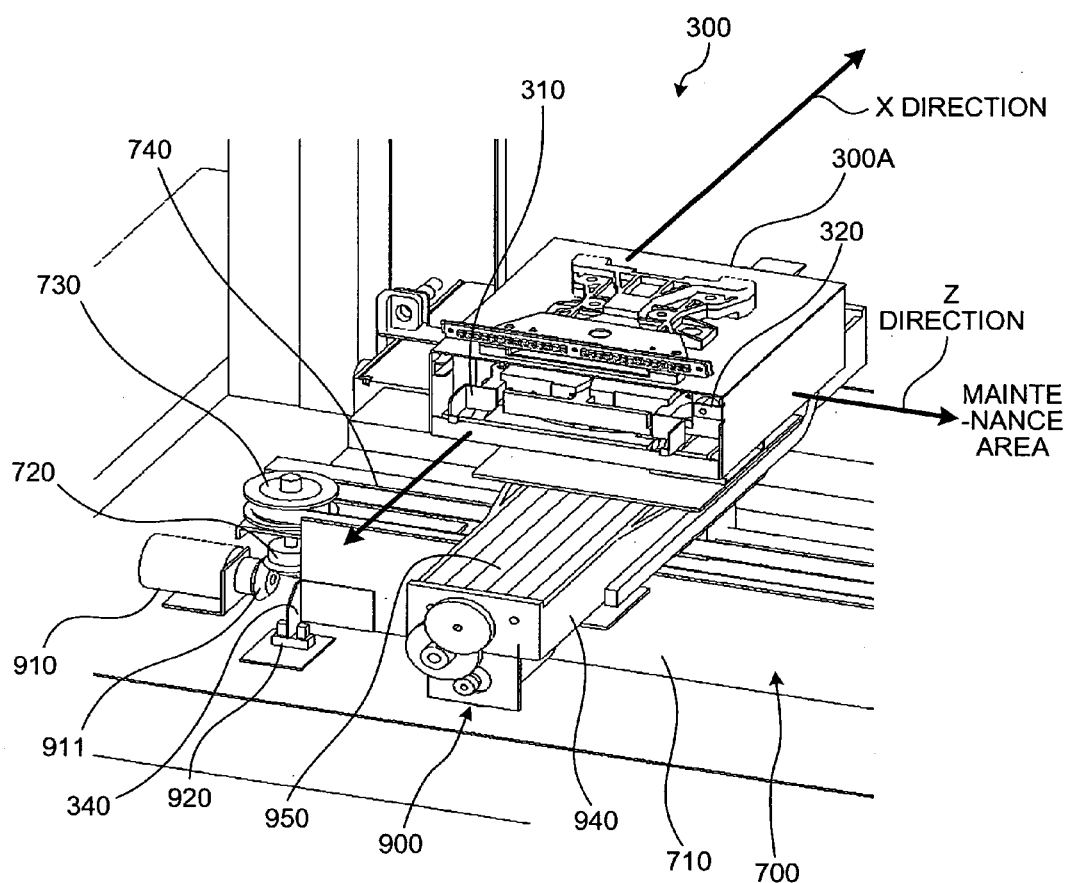
FIG. 8 is an enlarged perspective view of a main unit of the first conveying mechanism.

As shown in FIGS. 7 and 8, main units 300a, 400a of the first and the second conveying mechanisms 300, 400 are provided with hand mechanisms 310, 410 that attach/detach (accommodate/take out) a designated magnetic tape cartridge to/from (in/from) the magnetic tape storage shelf 220, and swivel mechanisms 320, 420 that rotate directions of the main units 300a, 400a by an angle of 180 degrees. The hand mechanisms 310, 410 have functions that grasp a magnetic tape cartridge accommodated in the storage shelf 220 to convey the same to the recording and reproducing unit 230. The swivel mechanisms 320, 420 have functions that rotate the directions of the main units 300a, 400b (the directions of the hand mechanisms 310, 410 in an actual apparatus) to the magnetic tape storage shelves 220 positioned at left and right sides of the magnetic tape library apparatus 100 by an angle of 180 degrees.

In the conventional magnetic tape library apparatus, however, since the magnetic tape storage shelf 220 is inclined by a predetermined angle to prevent magnetic tape cartridges from springing out of the magnetic tape storage shelf, each conveying mechanism must be provided with a tilt mechanism for tilting a corresponding hand mechanism. In the present invention, however, the magnetic tape storage shelf 220 is provided with a spring-out preventing mechanism that prevents a magnetic tape cartridge from springing out thereof, it is unnecessary to provide the conventional tilt mechanism.

As shown in FIGS. 7 and 8, the Z mechanism 700 is configured by a rail member 710 that moves the first and the second conveying mechanisms 300, 400 in forward and rearward directions of the apparatus 100 (a front side of the apparatus 100 and a side of the recording and reproducing unit 230), a transmission gear 720, a transfer pulley 730, and a wire 740. The first and the second conveying mechanisms 300, 400 are moved toward the recording and reproducing unit 230 according to actuation of the Z mechanism 700.

The X mechanism 900 is configured by a moving member 940 that moves the first and the second conveying mechanisms 300, 400 in front and rear directions (toward the front of the apparatus 100 and toward the recording and reproducing unit 230) of the magnetic tape library apparatus 100. As shown in FIG. 8, the moving member 940 is arranged so as to be substantially perpendicular to the rail member 710 configuring the Z mechanism 700 and can move the first and the second conveying mechanisms 300, 400 in either of the left and right magnetic tape storage shelves 220 along a groove 950 formed in the moving member 940.

As shown in FIG. 8 in detail, a saving driving motor 910 that moves the first conveying mechanism 300 to the "maintenance area" and a saving sensor 920 that detects that the first conveying mechanism 300 has descended to the lowermost position are provided at the lowermost position in the magnetic tape library apparatus 100. The "maintenance area" here is provided as an area (a specific area) where the first conveying mechanism 300 is temporarily saved during a maintenance work of the first conveying mechanism 300 or when a failure occurs.

Specifically, as shown in FIG. 8, when the first conveying mechanism 300 is descended to the lowermost position in the apparatus 100 and a shielding plate 340 of the first conveying mechanism 300 shields a detecting unit of the saving sensor 920 (the sensor is turned on), the saving driving motor 910 starts drive (the motor is actuated). Thereby, a driving gear 911 fixed to an output shaft of the saving driving motor 910 and the transmission gear 720 are caused to mesh with each other, so that rotational driving force of the saving driving motor 910 is transmitted to the transfer pulley 730 via the driving gear 911 and the transmission gear 720.

As a result, the first conveying mechanism 300 is moved toward the "maintenance area" (in the Z-axis direction on the right side in FIG. 8) at the front side of the apparatus 100. In this case, such a control is made based upon a servo control of the saving diving motor 910 that the first conveying mechanism 300 is stopped at a predetermined position in the "maintenance area". In this embodiment, a home position sensor 930 (see FIG. 4B) is provided at a right side position in the apparatus 100, and the stopping position of the first conveying mechanism 300 is controlled by the home position sensor 930.

The first and the second conveying mechanisms 300, 400 can be subjected to a maintenance work or inspection/repair work within the "maintenance area". As described above, at an ON time of the home position sensor 930, a conveyance control is switched from the first conveying mechanism 300 to the second conveying mechanism 400, so that actuation (conveyance of a magnetic tape cartridge) performed by the second conveying mechanism 400 is made possible.

Normal operations (conveyance processing procedure of a magnetic tape cartridge performed by the first conveying mechanism 300) of respective mechanisms in the magnetic tape library apparatus 100 thus configured and control actions at a time of failure occurrence will be explained with reference to configuration views of the magnetic tape library apparatus shown in FIG. 4A (a top view) and FIG. 4B (a side view), a flowchart shown in FIG. 9, and a timing chart shown in FIG. 10. The timing chart shown in FIG. 10 represents timings of ON/OFF turned by the hand mechanisms 310, 410, the swivel mechanisms 320, 420, the Z mechanism 700, the Y mechanism 800, the X mechanism 900, and the recording and reproducing unit 230.

Figure 9:
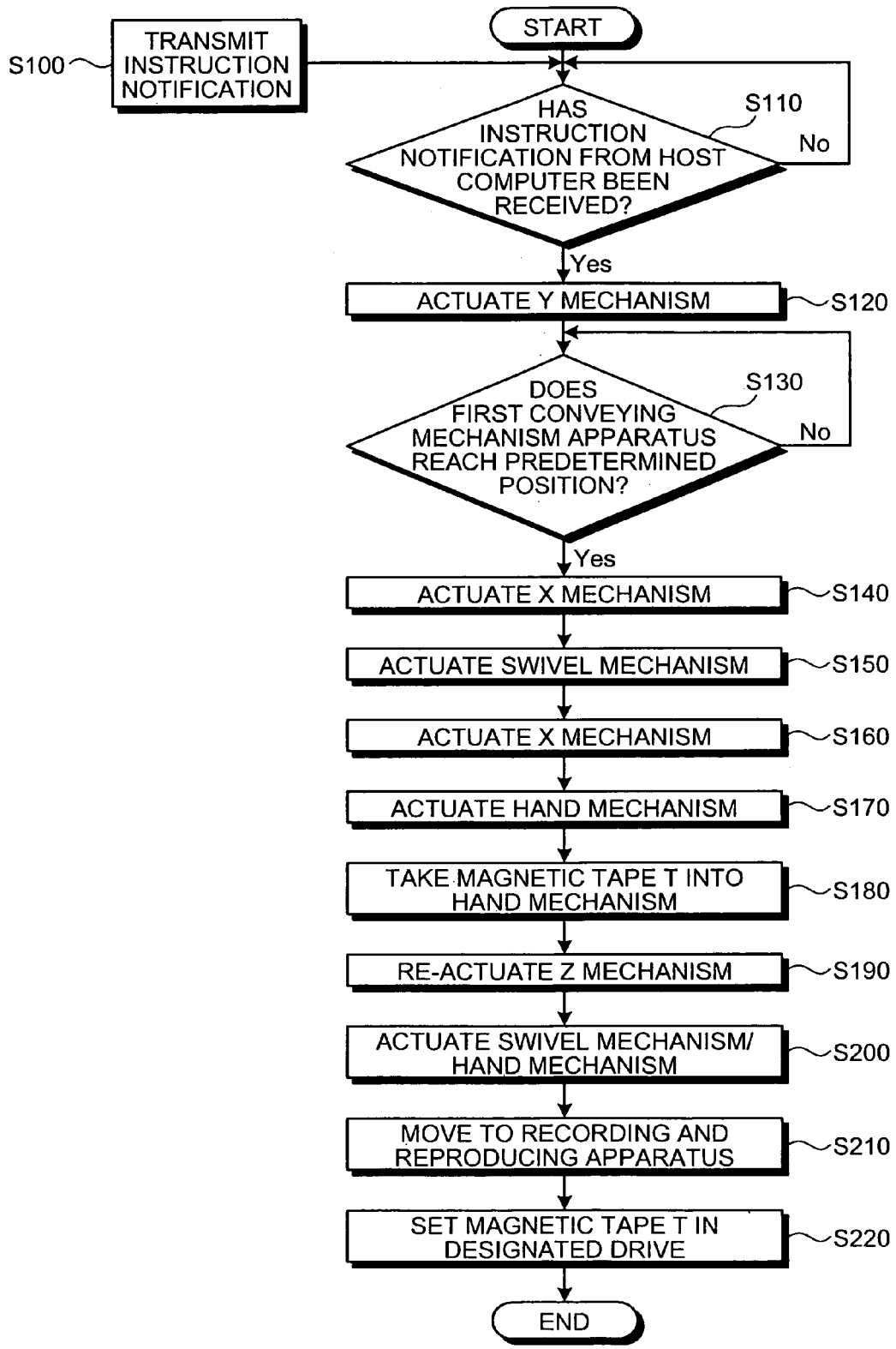
FIG. 9 is a flowchart of a procedure for conveying processing of a magnetic tape cartridge performed by the magnetic tape library apparatus during normal operation.
Figure 10:
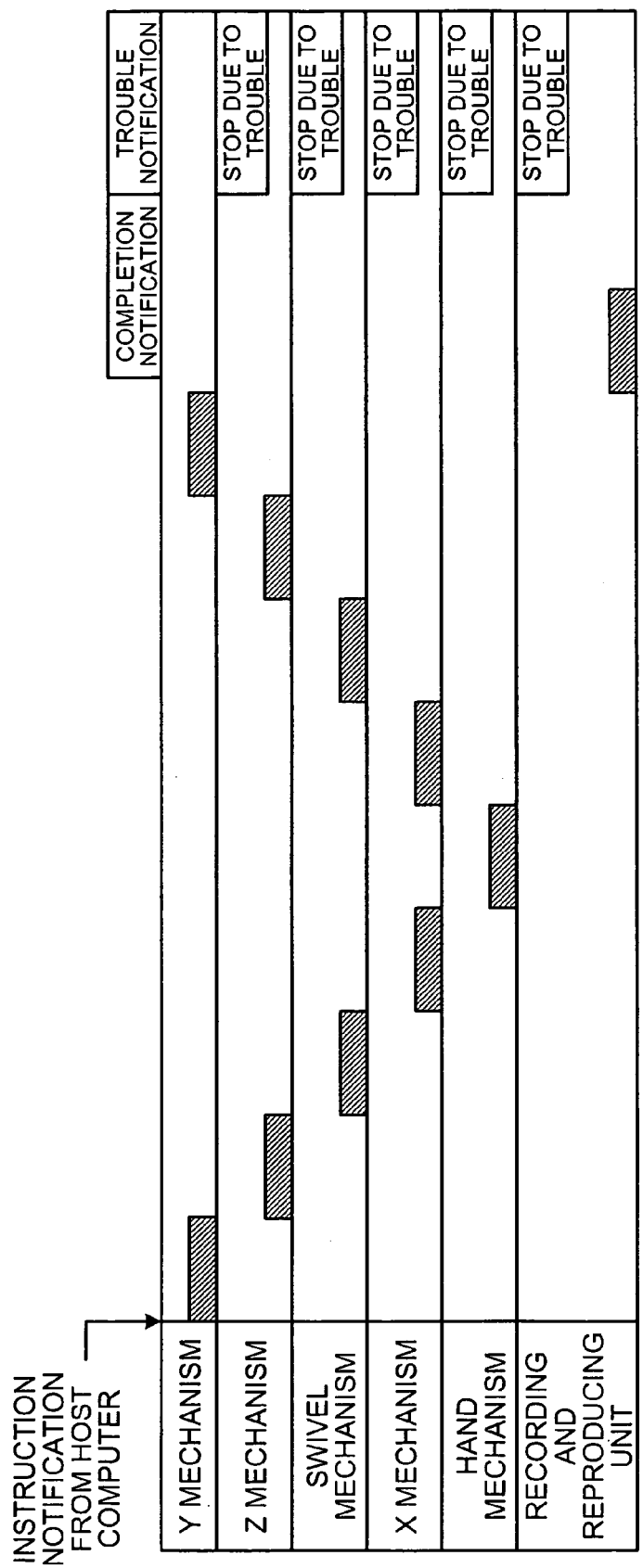
FIG. 10 is a timing chart of conveyance performed by the magnetic tape library apparatus during normal operation.

That is, as shown on the flowchart in FIG. 9, when an instruction notification (recording/reproducing instruction to a magnetic tape T) is first transmitted from the host computer to the magnetic tape library apparatus 100 (step S100), determination on the instruction notification is made in Step S110. When it is determined according to the determination in step S110 that the instruction notification from the host computer has been received (step S110: Yes), driving of the first conveyance driving motor 810 starts, so that ascending/descending movement of the first conveying mechanism 300 is started in response to actuation of the Y mechanism 800 (step S120).

When it is determined according to determination in step S130 that the first conveying mechanism 300 reaching a position of the storage shelf 220 (a position of a cell) in which the designated magnetic tape cartridge is stored (step S130: Yes), operation conducted by the X mechanism 900 is started (step S140). Specifically, according to the ascending/descending movement of the first conveying mechanism 300 in step S120, the first conveying mechanism 300 moves to a position (a vertical position) of the designated magnetic tape cartridge and according to the actuation of the X mechanism 900 in step S140, a position in the Z direction (front or rear position) is adjusted. Specifically, the first conveying mechanism 300 approaches to the designated storage shelf 220 according to actuation of the X mechanism 900. In fact, the hand mechanism 310/the swivel mechanism 320 provided on the first conveying mechanism 300 moves to approach to the storage shelf 220.

The swivel mechanism 310 actuates (step S150), so that the first conveying mechanism 300 can stop at a position where it faces a magnetic tape cartridge to be recorded/reproduced or the designated cartridge in a state approaching to each other. Specifically, the hand mechanism 310 (410) can be caused to face either one of the R side (right side) or L side (left side) magnetic tape storage shelf 220 that stores the designated magnetic tape cartridge therein.

By actuating the hand mechanism 310 of the X mechanism 900 (step S160), the first conveying mechanism 300 is then caused to face the designated magnetic tape cartridge, the designated magnetic tape cartridge is grasped by the hand mechanism 310 (step S170), and the magnetic tape cartridge is taken in from the storage shelf 220 (step S180).

By actuating the Z mechanism 700 again, the hand mechanism 310/swivel mechanism 320 in the first conveying mechanism 300 is moved to an approximately central portion of the base (while the designated magnetic tape cartridge is being held by the hand mechanism 310) (step S190). The hand mechanism 310 is then caused to face the recording and reproducing unit 230 according to actuation of the swivel mechanism 320 (step S200). Thereafter, the taken-out magnetic tape cartridge is moved to the position of the recording and reproducing unit 230 (step S210), and the magnetic tape cartridge is set in a designated drive position in the recording and reproducing unit 230 (step S220). Thus, the conveyance control processing is completed (End).

A switching control processing procedure performed by the magnetic tape library apparatus 100 in this embodiment will be explained with reference to the flowchart shown in FIG. 11 and the timing chart shown in FIG. 12. The flowchart shown in FIG. 11 represents a processing procedure conducted when an abnormal state is detected in the magnetic tape library apparatus 100.

Figure 11:
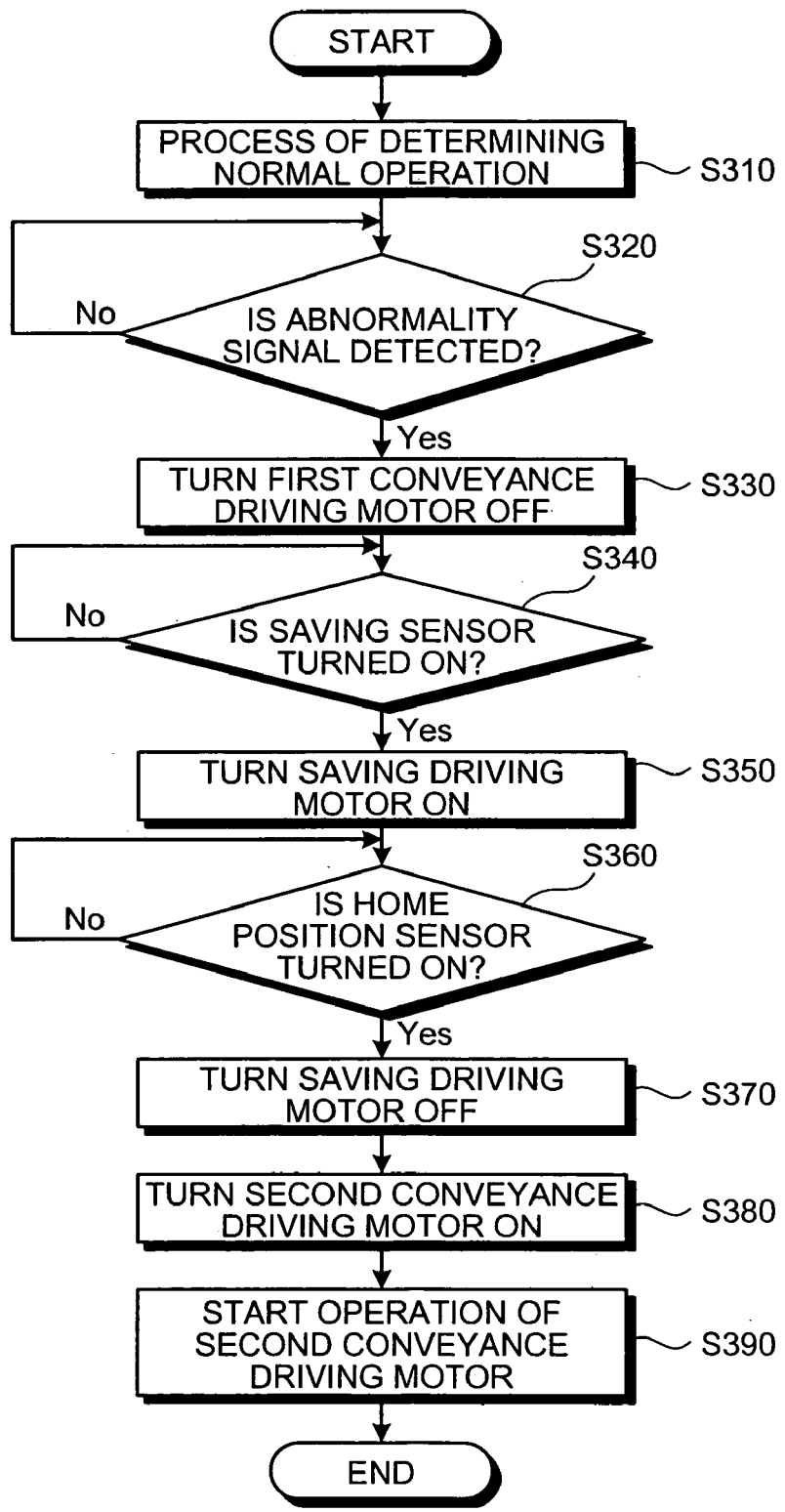
FIG. 11 is a flowchart of a procedure for conveying processing of a magnetic tape cartridge performed by the magnetic tape library apparatus at a time of detecting an abnormality signal.
Figure 12:
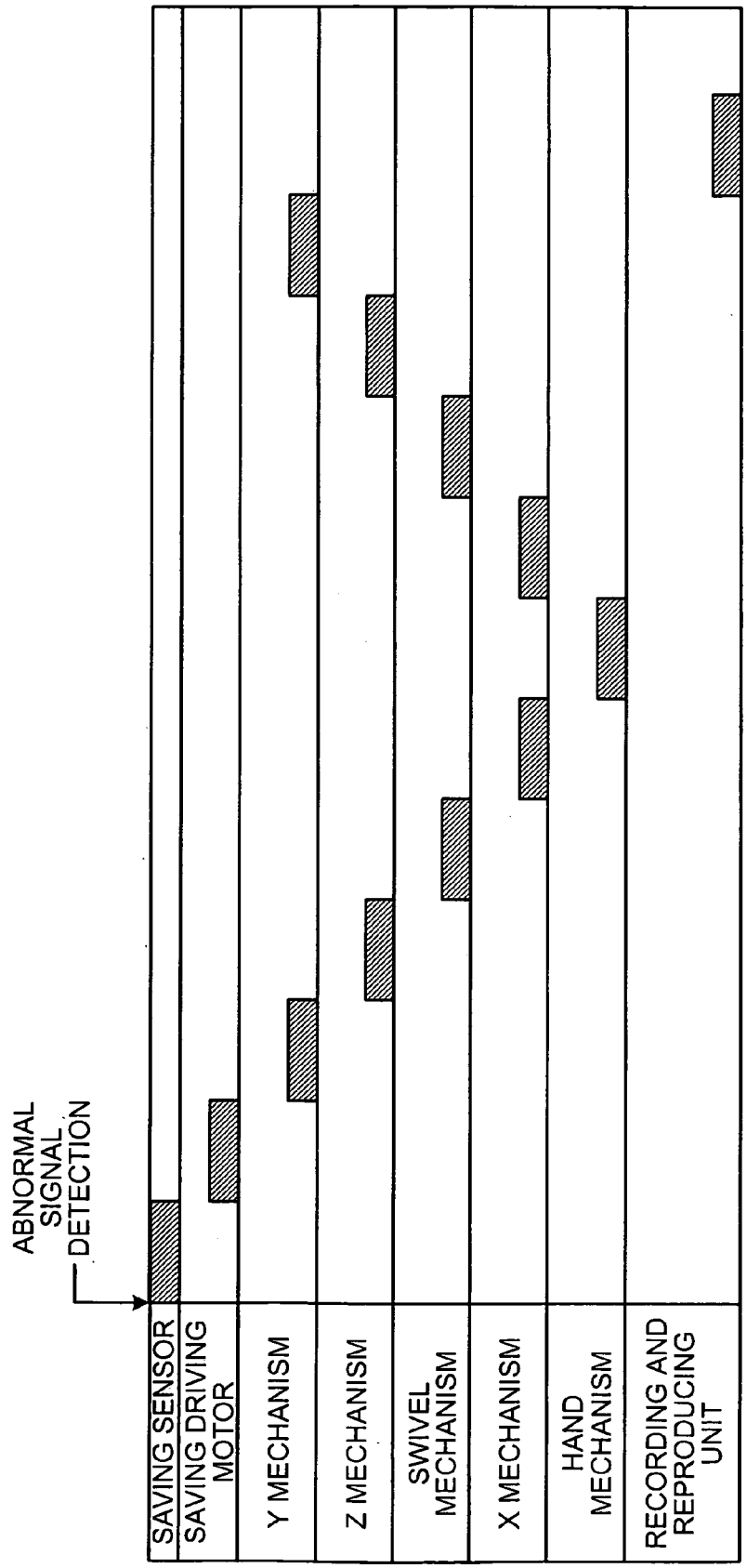
FIG. 12 is a timing chart at the time of detecting an abnormality signal.

Specifically, the flowchart shown in FIG. 11 depicts a processing for transfer from the conveying (insertion/taking-out) control procedure of a magnetic tape cartridge performed by the first conveying mechanism 300 during normal operation to the conveying control procedure of a magnetic tape cartridge performed by the second conveying mechanism 400 (the conveying mechanism for stand-by). In the flowchart shown in FIG. 11, explanation will be made assuming that failure has occurred in any of constitutional elements in the first conveying mechanism 300. The timing chart shown in FIG. 12 represents timings of ON/OFF turned by the saving driving motor 910, the saving sensor 920, the hand mechanisms 310, 410, the swivel mechanisms 320, 420, the Z mechanism 700, the Y mechanism 800, the X mechanism 900, and the recording and reproducing unit 230.

That is, as shown on the flowchart shown in FIG. 11, a determination processing of a normal operation is first conducted in the magnetic tape library apparatus 100 (step S310), and determination is made as to whether a normal operation is performed. For example, the determination processing of the normal operation includes determination as to whether the driving timing (ON/OFF) of the first conveyance driving motor 810 is normal. Specifically, determination as to whether an abnormality signal has been detected is made (step S320). When an "abnormality signal" is detected according the processing in step S320 (step S320: Yes), a driving power source that actuates the first conveying mechanism 100 is stopped (turned OFF) (step S330).

Thereby, the first conveying mechanism 300 descends down to the lowermost position of the main unit of the apparatus 100 due to self-weight. The "abnormality signal" is detected at such a time as when the first conveyance driving motor 810 is failed (a time-out error of each motor), for example. In fact, even when the "abnormality signal" is detected at a time of motor failure, a control for repeating re-try by a predetermined number of times is made. However, when the abnormality detection is not cancelled even after performing the re-try by the predetermined number of times, it is determined that the first conveyance driving motor 810 is out of order.

Determination as to whether the saving sensor 920 is turned ON (step S340) is made, and when it is determined according to the step S340 that the saving sensor 920 has been turned ON (step S340: Yes), an actuation start signal for starting drive is notified to the saving driving motor 910 (step S350).

As described above, when the first conveying mechanism 300 descends down to the lowermost position due to its own weight, the driving gear 911 of the saving driving motor 910 meshes with the transmission gear 720 of the first conveying mechanism 300, so that the first conveying mechanism 300 starts moving toward the "maintenance area" according to driving of the transfer pulley 730 and the wire 740 caused by actuation (driving) of the saving driving motor 910 in step S350. The first conveying mechanism 300 is then subjected to a maintenance work or failure repairing work in the "maintenance area".

Determination is made as to whether the home position sensor 930 (see FIG. 4B) has been turned ON (step S360).

When it is determined according to the determination in step S360 that the home position sensor 930 has been turned ON (step S360: Yes), an actuation stopping signal is notified to the saving driving motor 910 being driven (step S370).

The control advances to the conveyance control processing performed by the second conveying mechanism 400 (step S370). Specifically, according to driving start (ON) of the second conveyance driving motor 820 (step S380), actuation of the second conveying mechanism 400 on standby at an upper portion of the apparatus 100 starts (step S390) to enter in a state that the apparatus 400 is waiting for a notification from the host computer. Normal processing steps (step S100 to step S220) similar to those on the flowchart shown in FIG. 9 are then performed.

As explained above, according to the library apparatus 100 of the present invention, the magnetic tape library apparatus 100 is configured by the magnetic tape storage shelf 220 having the plurality of cells 210 that store a plurality of magnetic tape cartridges, the recording and reproducing unit 230 that performs recording/reproducing of information or data on/from a magnetic tape, the first conveying mechanism 300 that performs conveyance of a magnetic tape cartridge between the storage shelf 220 and the recording and reproducing unit 230 during normal operation, and the second conveying mechanism 400 that performs conveyance of a magnetic tape cartridge during a abnormal-operation of the first conveying mechanism 300, the second conveying mechanism 400 newly provided performs conveyance of a magnetic tape cartridge even in a state where the first conveying mechanism 300 can not serve due to its maintenance or its failure, or during abnormal-operation of the first conveying mechanism 300. Therefore, the present invention can provide a magnetic tape library apparatus that allows system operations without stopping service provided by the magnetic tape library apparatus 100.

According to the first aspect of the invention, since the library apparatus is configured to perform conveyance of each cartridge accommodating a recording medium by the first conveying mechanism during a normal operation and perform conveyance of each cartridge accommodating a recording medium by the second conveying mechanism when abnormal-operation of the first conveying mechanism is detected by an abnormal-operation detecting unit, each cartridge accommodating a recording medium is conveyed by the second conveying mechanism during a non-operable state of the first conveying mechanism, for example, even during a maintenance of the first conveying mechanism or when the first conveying mechanism has failed. Therefore, repair/maintenance to the failed first conveying mechanism (recovery maintenance) can be performed without stopping the system and an operation of the system on the client side can be always maintained favorably.

According to the second aspect of the invention, since the library apparatus is configured to perform conveyance of each cartridge accommodating a recording medium by the first conveying mechanism during a normal operation and perform conveyance of each cartridge accommodating a recording medium by the second conveying mechanism when abnormal-operation of the first conveying mechanism is detected by the abnormal-operation detecting unit, a trouble in the first conveying mechanism can be securely detected by the abnormal-operation detecting unit and each cartridge accommodating a recording medium is conveyed by the second conveying mechanism during a non-operable state of the first conveying mechanism, for example, even during a maintenance of the first conveying mechanism or when the first conveying mechanism has failed. Therefore, repair/maintenance to the failed first conveying mechanism (recovery maintenance) can be performed without stopping the system and an operation of the system on the client side can be always maintained favorably.

According to the third aspect of the invention, since, the first conveying mechanism provided in the library apparatus is descended by the ascending and descending unit, when abnormal-operation of the first conveying mechanism is detected by the abnormal-operation detecting unit, and the first conveying mechanism is conveyed by the conveying unit to the maintenance area where a maintenance of the first conveying mechanism is conducted, when it is detected by the lowermost-position detecting unit that the first conveying mechanism has been descended to the lowermost descended position, transfer of the first conveying mechanism to be subjected to inspection/repair to the maintenance area can be reliably confirmed and conveyance of each cartridge accommodating a recording medium conducted by the second conveying mechanism on standby can be performed continuously so that the system can be prevented from being suspended.

According to the fourth aspect of the invention, since the library apparatus includes the home-position detecting unit detecting that the first conveying mechanism reaching the maintenance area and it is detected by the home-position detecting unit that the first conveying mechanism reaching the maintenance area, it can be reliably and correctly detected by the home-position detecting unit that the first conveying mechanism reaching the maintenance area where maintenance/repair is conducted.

According to the fifth aspect of the invention, since, when it is detected by the home-position detecting unit that the first conveying mechanism reaching the maintenance area, a control on conveyance of each cartridge accommodating a recording medium conducted by the second conveying mechanism is started, transfer of the first conveying mechanism to be subjected to maintenance/repair to the maintenance area can be reliably confirmed, and conveyance of each cartridge accommodating a recording medium performed by the second conveying mechanism put in a standby state can be performed continuously, so that the system can be prevented from being stopped.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A library apparatus comprising:
    a storage shelf that has a plurality of cells for housing a cartridge that stores a plurality of recording media;
    a recording and reproducing unit that performs recording/reproducing of information to/from the recording media;
    a conveying mechanism that conveys the cartridge to a predetermined position in the storage shelf, between the storage shelf and the recording and reproducing unit, the conveying mechanism including a first conveying mechanism that conveys the cartridge during a normal operation of the library apparatus and a second conveying mechanism that conveys the cartridge during an abnormal-operation of the first conveying mechanism;
    an abnormal-operation detecting unit that detects the abnormal-operation of the first conveying mechanism;

an elevating unit elevates the first conveying mechanism up and down;

a lowermost-position detecting unit that detects a lowermost position of the first conveying mechanism; and a conveying unit that conveys the first conveying mechanism to a maintenance area where a maintenance of the first conveying mechanism is performed, wherein when the abnormal-operation detecting unit detects the abnormal-operation of the first conveying mechanism, the elevating unit elevates the first conveying mechanism down, and when the lowermost-position detecting unit detects that the first conveying mechanism is down to the lowermost position, the conveying unit conveys the first conveying mechanism to the maintenance area.

2. The library apparatus according to claim 1, further comprising a home-position detecting unit that detects arrival of the first conveying mechanism at the maintenance area.

3. The library apparatus according to claim 2, wherein, when the home-position detecting unit detects that the first conveying mechanism has arrived at the maintenance area, the second conveying mechanism starts to convey the cartridge.

4. The library apparatus according to claim 1, wherein the storage shelf includes a cartridge spring-out preventing mechanism that prevents the cartridge from springing out.

5. The library apparatus according to claim 1, wherein each of the first conveying mechanism and the second conveying mechanism includes a balancing member that controls ascending and descending inside the library apparatus.

6. The library apparatus according to claim 1, further comprising: an inner locker that accommodates the library apparatus therein; and an outer locker that accommodates the inner locker therein.

7. A library apparatus comprising:

a storage shelf that has a plurality of cells for housing a cartridge that stores a plurality of recording media;

a recording and reproducing unit that performs recording/reproducing of information to/from the recording media; and a conveying mechanism that conveys the cartridge to a predetermined position in the storage shelf, between the storage shelf and the recording and reproducing unit, the conveying mechanism including a first conveying mechanism that conveys the cartridge during a normal operation of the library apparatus and a second conveying mechanism that conveys the cartridge during an abnormal-operation of the first conveying mechanism;

an abnormal-operation detecting unit that detects the abnormal-operation of the first conveying mechanism;

an elevating unit that elevates the first conveying mechanism up and down;

a lowermost-position detecting unit that detects a lowermost position of the first conveying mechanism; and a conveying unit that conveys the first conveying mechanism to a maintenance area where a maintenance of the first conveying mechanism is performed, wherein when the abnormal-operation detecting unit detects the abnormal-operation of the first conveying mechanism, the second conveying mechanism conveys the cartridge after the elevating unit elevates the first conveying mechanism down, and the conveying unit conveys the first conveying mechanism to the maintenance area when the lowermost-position detecting unit detects that the first conveying mechanism is down to the lowermost position.

8. The library apparatus according to claim 7, further comprising a home-position detecting unit that detects arrival of the first conveying mechanism at the maintenance area.

9. The library apparatus according to claim 8, wherein, when the home-position detecting unit detects that the first conveying mechanism has arrived at the maintenance area, the second conveying mechanism starts to convey the cartridge.

10. The library apparatus according to claim 7, wherein the storage shelf includes a cartridge spring-out preventing mechanism that prevents the cartridge from springing out.

11. The library apparatus according to claim 7, wherein each of the first conveying mechanism and the second conveying mechanism includes a balancing member that controls ascending and descending inside the library apparatus.

12. The library apparatus according to claim 7, further comprising:

an inner locker that accommodates the library apparatus therein; and an outer locker that accommodates the inner locker therein.

* * * * *